(12) United States Patent
Schneider et al.

(10) Patent No.: US 7,783,673 B2
(45) Date of Patent: Aug. 24, 2010

(54) COMPUTER-BASED SYSTEM AND METHOD FOR DETECTING RISKS

(75) Inventors: Reto Schneider, Zurich (CH); Annabelle Hett, Obfelden (CH); Rudolf Frei, Naenikon (CH)

(73) Assignee: Swiss Reinsurance Company, Zurich (CH)

( * ) Notice: Subject to any disclaimer, the term of this patent is extended or adjusted under 35 U.S.C. 154(b) by 507 days.

(21) Appl. No.: 10/594,591

(22) PCT Filed: Feb. 18, 2005

(86) PCT No.: PCT/CH2005/000094
§ 371 (c)(1), (2), (4) Date: Jan. 23, 2007

(87) PCT Pub. No.: WO2005/096190
PCT Pub. Date: Oct. 13, 2005

(65) Prior Publication Data
US 2008/0243917 A1   Oct. 2, 2008

(30) Foreign Application Priority Data
Mar. 31, 2004   (EP)   ................................ 04405195

(51) Int. Cl.
*G06F 17/30* (2006.01)
(52) U.S. Cl. ...................... 707/802; 340/601
(58) Field of Classification Search ........................ None
See application file for complete search history.

(56) References Cited

U.S. PATENT DOCUMENTS

| | | | |
|---|---|---|---|
| 6,002,748 A | 12/1999 | Leichner | |
| 6,169,476 B1 | 1/2001 | Flanagan | |
| 6,670,908 B2 * | 12/2003 | Wilson et al. | 342/26 R |
| 7,109,859 B2 * | 9/2006 | Peeters | 340/539.11 |
| 2004/0075552 A1 * | 4/2004 | Rao et al. | 340/539.1 |
| 2007/0078695 A1 * | 4/2007 | Zingelewicz et al. | 705/8 |
| 2007/0112512 A1 * | 5/2007 | McConnell | 701/213 |

FOREIGN PATENT DOCUMENTS

WO     01 63534     8/2001

* cited by examiner

*Primary Examiner*—Debbie Le
(74) *Attorney, Agent, or Firm*—Oblon, Spivak, McClelland, Maier & Neustadt L.L.P.

(57) ABSTRACT

A system detecting emerging risks in various systems and relating a detected risk to its relative impact on a system or product. A server receives and stores risk information from geographically distributed computerized data sources via a communication network. The risk information includes an identification and rating of a specific risk, and information associating the specific risk with a geographical area. Utilizing the risk information and area attributes, such as correlation factors and spreading patterns, a specific risk emerging in a first geographical area and spreading to one or more second geographical areas is detected. Emerging risks can be detected in geographical areas for which no risk information has been received, allowing to set up, maintain, and operate a risk detection system with a simplified technical infrastructure since it is not necessary to measure, transmit, and store risk indicators for all geographical areas for which emerging risks are detected.

24 Claims, 1 Drawing Sheet

COMPUTER-BASED SYSTEM AND METHOD FOR DETECTING RISKS

TECHNICAL FIELD

The present invention relates to a computer-based system and a computer-based method for detecting risks. Specifically, the present invention relates to a computer-based system and a computer-based method for detecting risks by means of a server connected to a communication network. In a particular application, the invention relates to a computer-based system and a computer-based method, which relate a detected risk to its relative impact on a technical product or a technical system.

BACKGROUND ART

The detection and perception of risks is relevant in many systems of various types. Typically, risks are detected by means of sensors providing measurements of risk indicators. Up to a defined threshold value, the measurement value provided by a sensor can be used for the detection of a risk. Above the threshold value, the measurement value indicates an actual occurrence of an undesired event or critical state such as a malfunction or loss of control. In that sense, the detection and perception of risks is the anticipation and quantification of undesired or critical states and events. Generally, the detection and perception of risks is based on more than one risk indicator. Therefore, a technical infrastructure is necessary for collecting measurements of multiple risk indicators. Through communication links, measurement values of risk indicators are transmitted form the data sources to a common processing unit. In the processing unit the received measurement values of risk indicators are stored and based on the stored values emerging risks are detected. An emerging risk is characterized by an identification of the specific risk and a rating of that specific risk.

In large systems extended over wide geographical areas, for example power or communication networks, traffic transportation systems such as railways or highways, fuel transportation systems such as oil or gas pipelines, or civic structures such as dams, power plants, manufacturing plants or other large building complexes, a great variety of risks of technical, ecological, geological, meteorological, and even epidemiological, cultural, political and economical nature must be considered. Consequently, for detecting emerging risks in such systems, a variety of corresponding risk indicators needs to be measured, collected, and processed continuously and dynamically. Providing risk detection systems appropriate for detecting emerging risks in such large, distributed systems would be complex, require a long time to set up and come at high financial costs. Particularly, for detecting risks in systems extended over multiple geographical areas, it would be necessary to implement, operate and maintain a complex, distributed technical infrastructure for collecting measurements of risk indicators in multiple locations spread over extended geographical areas. Nevertheless, because of the potential relative impact of these risks on technical systems and structures and, consequently, on the environment and/or lives of humans, the detection, perception and quantification of emerging risks in such large systems is fundamental.

In U.S. Pat. No. 6,002,748 a disaster alert system is described, in which computer terminals transmit threat data and associated geographical data via a telecommunication network to a central computer. Based on the received geographical data, the central computer selects address information of local exchanges and transmits warning messages corresponding to the threat data to the selected local exchanges.

In U.S. Pat. No. 6,169,476 an early warning system for disasters is described, in which detection devices distributed geographically transmit data indicative of disasters to a central processing site. According to U.S. Pat. No. 6,169,476, warning messages are transmitted by the central processing site to danger areas and selected warning devices. The warning devices are selected based on their current geographical position.

In WO 01/63534 an assessment system for insurance underwriting is described in which an insurance risk is determined for a structure to be insured. Based on the geographic position of the structure, the system determines the distance of the structure to known fault lines and data describing geological formations existing between the structure and the fault lines. Based on this data, statistical assessments of expected damage levels for the structure are made.

DISCLOSURE OF INVENTION

It is an object of the present invention to provide a computer-based system and a computer-based method for facilitating the exchange and collection of information regarding perceptions of recognized and newly emerging risks. In particular, it is an object of this invention to provide a computer-based system and a computer-based method for detecting risks in systems extending over multiple defined geographical areas. It is a further object of this invention to provide a computer-based system and a computer-based method for detecting risks emerging in multiple defined geographical areas. Furthermore, it is an object of this invention to provide a computer-based system and a computer-based method for detecting risks emerging in multiple defined geographical areas, wherein it is not necessary to collect measurements of risk indicators in all of these defined geographical areas.

According to the present invention, these objects are achieved particularly through the features of the independent claims. In addition, further advantageous embodiments follow from the dependent claims and the description.

According to the present invention, the above-mentioned objects are particularly achieved in that a computer-based risk detection system comprising a server connected to a communication network further comprises means for receiving on the server risk information from geographically distributed computerized data sources via the communication network, the risk information including an identification of a specific risk, a rating of the specific risk, and information for associating the specific risk with a geographical area. Moreover, the computer-based risk detection system comprises means for storing received risk information, the identification of the specific risk and the rating of the specific risk being assigned to a first geographical area. Furthermore, the computer-based risk detection system comprises detection means for detecting based on stored risk information a specific risk emerging in the first geographical area and spreading to one or more second geographical areas. In addition, the computer-based risk detection system comprises signalling means for providing to an interface output data depending on the detected emerging risk and the second geographical areas. For example, depending on the type of the detected emerging risk, the particular geographical area, and the rating of that risk, the output data provided by signalling means to the interface is indicative of a defined state or represents a defined instruction. According to the present invention, the detection means are designed to detect the emerging specific risk based on the ratings of the specific risks. Associating risk information with a first geographical area and detecting a specific risk emerging in the first geographical area and spreading to one or more second geographical areas has the advantage that emerging specific risks can be detected in geographical areas for which no risk information has been received in the server. Consequently, emerging specific risks can be detected even in geographical areas where none or only a limited risk detection infrastructure is implemented and/or operational. Thus, the technical infrastructure of the risk detection system can be reduced and simplified because it is not necessary to measure, transmit, and store risk indicators for all geographical areas for which emerging risks are detected. Installation and operation of a limited technical infrastructure makes it possible to conserve energy and materials. Furthermore, providing output data to an interface, particularly signalling a defined state or instruction to the interface, makes it possible to control, depending on detected specific risks, the state of systems as well as operations and processes in these systems. It is even possible to control system states, operations, and processes in geographical areas for which no risk information has been received in the server.

In an embodiment, the interface is part of the risk detection system, the interface is designed to store the output data provided by the signalling means, and the interface and the output data stored therein are accessible to devices external to the risk detection system. In this way, it is possible, for example, to make the state of external devices or the performance of processes and operations in these external devices dependent on output data stored in the risk detection system. It is not necessary for the detection system to transmit actively output data to external devices but external devices retrieve autonomously, for example periodically, output data from the interface of the risk detection system.

In a preferred embodiment, the risk detection system further comprises stored area attributes associated with geographical areas and the detection means are designed to detect the emerging specific risk based on stored area attributes associated with the first geographical area and with the second geographical area. For example, the area attributes include information about common characteristics of geographical areas and/or correlation factors associated with geographical areas indicating interdependencies between geographical areas. Storing and using area attributes makes possible the detection of emerging risks based on common characteristics of and interdependencies between geographical areas. Hence, using area attributes for detecting emerging risks makes possible the risk detection for geographical areas for which none or only limited risk information has been received and stored in the server. Consequently, the technical infrastructure of the risk detection system can be simplified considerably because it is not necessary to set up, maintain, and operate a technical infrastructure for measuring and transmitting risk indicators in all geographical areas for which emerging risks are to be detected.

According to the present invention, the risk detection system further comprises stored correlation factors associated with geographical areas and/or stored data about spreading patterns and the detection means are designed to detect the emerging specific risk based on the stored correlation factors and/or based on the stored data about spreading patterns. For example, the stored data about spreading patterns are based on recordings of passed spreading of risks across boundaries of defined geographical areas. Storing and using data about spreading patterns makes possible the detection of emerging risks in geographical areas without any or with only limited technical infrastructure of a risk detection system. A risk emerging in a geographical area without any or with only limited technical infrastructure is detected based on risk information received from another geographical area and based on stored data about spreading patterns indicating passed spreading of risks from this other geographical area to the geographical area with limited technical infrastructure. Consequently, it is not necessary to set up, maintain and operate a technical infrastructure for measuring and transmitting risk indicators in all geographical areas for which emerging risks are detected.

In an embodiment, the detection means include an expert system designed to detect the emerging specific risk based on stored rules. Using a rules based expert system makes possible flexible and efficient adaptation of rules and thus the risk detection system to new scenarios, situations, and information.

Preferably, the risk detection system further comprises a database, the means for storing received risk information are designed to store the received risk information in the database, and the detection means are designed to detect the emerging specific risk by periodically extracting risk information stored in the database. Storing the received risk information in a database facilitates recording of time sequences of risk information the time sequences enabling trend analysis of risks. Detecting emerging risks by periodically extracting risk information stored in the database makes possible ongoing risk detection at defined time intervals independent from the frequency and times at which risk information is received in the server from the geographically distributed data sources.

In an embodiment, the detection means are designed to generate automatically a message to an administrator upon detection of an emerging specific risk. Messages to administrators make it possible to provide automatically and dynamically information, warnings, and/or alarms about imminent risks to administrators of systems so that necessary precautions and emergency measures can be taken.

Preferably, the specific risks include risks associated with technical, ecological, geological, meteorological, epidemiological, cultural, political and/or economical systems, and the risk detection system further comprises means to relate a detected emerging risk to its relative impact on a technical product or a technical system. For the insurance industry, the risk detection system further comprises means to relate a detected emerging risk to its relative impact on an insurance product. In an embodiment, the risk information includes information relating to a relative impact of an identified specific risk on a technical product, a technical system and/or an insurance product. Relating a detected emerging risk to its relative impact on a technical product or a technical system makes it possible to assess the probability that an undesired or critical state of the technical product or system will be reached, the probability that an undesired or critical event in the technical product or system will occur, and what the consequences of such a state or event will be. Moreover, relating a detected emerging risk to its relative impact on a technical product or a technical system facilitates timely set up of precautions and preventive measures in preparation of the impending consequences. Relating a detected emerging risk to its relative impact on an insurance product makes it possible to assess the consequences of undesired or critical states and events associated with the particular risk for the insurance product itself, for example the number and amount of insurance claims that would need to be paid.

In addition to a computer-based risk detection system, the present invention also relates to a computer-based method for detecting risks and to a computer program product including computer program code means for controlling one or more processors of the computer-based risk detection system, particularly, a computer program product including a computer readable medium containing therein the computer program code means.

BRIEF DESCRIPTION OF DRAWINGS

The present invention will be explained in more detail, by way of example, with reference to the only drawing attached in which.

MODE(S) FOR CARRYING OUT THE INVENTION

Figure 1:
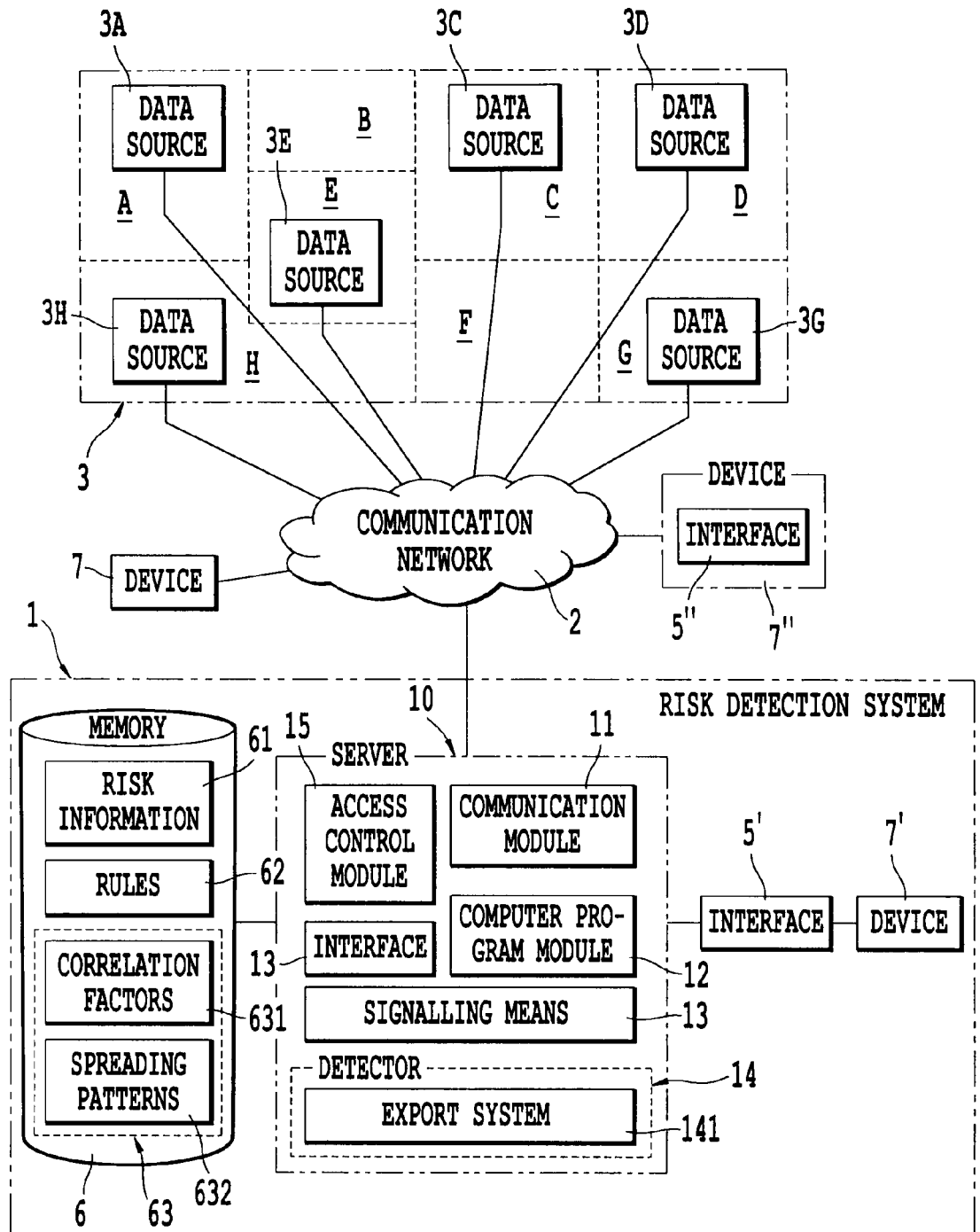
FIG. 1 shows a block diagram illustrating a computer-based risk detection system and a segment of a geographical territory, the risk detection system including a server, the geographical territory including several geographical areas, and computerized data sources located in some of the geographical areas being connected to the server via a communication network.

In FIG. 1, reference numeral 1 refers to a computer-based risk detection system. The risk detection system 1 comprises at least one server 10. Server 10 includes one or more processors controlled by computer program code means stored in a memory of the server 10 or stored on a computer readable medium inserted into the server 10.

Reference numeral 3 refers to a segment of a geographical territory. Segment 3 includes multiple geographical areas A, B, C, D, E, F, G, H defined by their respective geographical boundaries.

There are computerized data sources 3A, 3C, 3D, 3E, 3G, 3H located in the geographical areas A, C, D, E, G, H. The data sources 3A, 3C, 3D, 3E, 3G, 3H are connected to the risk detection system 1 via a communication network 2. Preferably, the data sources 3A, 3C, 3D, 3E, 3G, 3H are workstations such as personal computers. In one embodiment, at least some of the data sources 3A, 3C, 3D, 3E, 3G, 3H include only a sensor element and a communication module for transmitting measurement values from the sensor element via the communication network 2 to the risk detection system 1. The data sources 3A, 3C, 3D, 3E, 3G, 3H are designed to transmit risk information to the risk detection system 1. Particularly, the data sources 3A, 3C, 3D, 3E, 3G, 3H are designed to transmit risk information via the communication network 2 to the server 10 of the risk detection system 1.

The data sources 3A, 3C, 3D, 3E, 3G, 3H are located geographically in diverse locations, so as to provide input regarding risk perceptions from different geographical areas A, C, D, E, G, H, for example from different components of a large system or from different population centres. This may be important to the prompt detection of perceptions regarding risks, which may emerge locally and then spread to other locations. Such geographical distribution of data sources 3A, 3C, 3D, 3E, 3G, 3H may also be beneficial in understanding the impact of ecological, geological, meteorological, epidemiological, cultural, political and/or economical factors upon perceptions of common or diverse risk. For example, an embodiment used to gather perceptions regarding risks specific to a geographical territory, for instance a city, may be served best by a group of data sources 3A, 3C, 3D, 3E, 3G, 3H representative of each section or area of the geographical territory, for instance a district of a city, to which the risk is relevant. Indeed, in such an example, input from data sources 3A, 3C, 3D, 3E, 3G, 3H located in geographically remote areas may be irrelevant. In short, the desired degree and measure of diversity of the data sources 3A, 3C, 3D, 3E, 3G, 3H will likely vary with particular risks and particular embodiments of the present invention.

The communication network 2 includes a fixed communication network such as a PSTN (public switched telephone network), an ISDN (integrated services digital network), a LAN or WAN (Local or Wide Area Network), point-to-point communication links, an Intranet, or the global Internet. Alternatively or in addition, the communication network 2 includes a mobile communication network such as a GSM-network (Global System for Mobile communication), a UMTS-network (Universal Mobile Telecommunication System), a WLAN (Wireless Local Area Network) or another mobile communication system, for example a satellite based system.

The server 10 comprises means for receiving risk information from the data sources 3A, 3C, 3D, 3E, 3G, 3H via the communication network 2. The means for receiving risk information include a communication module 11 for communicating over the communication network 2. The communication module 11 is implemented fully in hardware, or partly in hardware and partly in software.

The server 10 comprises means for storing received risk information. The means for storing received risk information include data memory 6 and a computer program module 12 for managing the data memory 6 and for writing the received risk information into the data memory 6. Preferably, the means for storing the received risk information include a database. Particularly, the means for storing the received risk information include a database management system for storing and managing the received risk information in the data memory 6. The received risk information can also be stored in data files, which are organized as electronic spreadsheets, for example. One skilled in the art will understand that data memory 6 can be implemented in one or more locations, i.e. the data memory can be located in the same housing as server 10, it can be located outside the housing of server 1, or it can be distributed over multiple servers.

TABLE 1

| received risk information | | | |
| --- | --- | --- | --- |
| identification of risk | rating of risk | information associated with geographical area | relative impact |

As is illustrated schematically in Table 1, the risk information received from the data sources 3A, 3C, 3D, 3E, 3G, 3H include an identification of a specific risk, a rating of the specific risk, information for associating the specific risk with a geographical area A, B, C, D, E, F, G, H, and, optionally, information relating the specific risk to a relative impact on a technical product, a technical system and/or an insurance product. The risk information relates to risks associated with technical, ecological, geological, meteorological, epidemiological, cultural, political and/or economical systems.

The identification of the specific risk is in the form of a numeric or alphanumeric code, or a descriptive text. The identification of the specific risk is provided automatically by the data sources 3A, 3C, 3D, 3E, 3G, 3H, for example as an identification of a sensor or a data source. Alternatively, the identification of the specific risk is provided to the data sources 3A, 3C, 3D, 3E, 3G, 3H by users via a user interface.

The rating of the specific risk is preferably a number or a value of a defined set of rating values, for example one of five levels ranging from 1 to 5 or from low to high, respectively. The rating of the specific risk is provided automatically by the data sources 3A, 3C, 3D, 3E, 3G, 3H, for example as a measurement value from a sensor or as a rating value calculated from measurement values provided by multiple sensors. Alternatively, the rating of the specific risk is provided to the data sources 3A, 3C, 3D, 3E, 3G, 3H by users via a user interface, for example by means of pick lists and rating tables. It is also possible to determine automatically in the data sources 3A, 3C, 3D, 3E, 3G, 3H or in the server 10 the rating of the specific risk from qualitative rating data, for example by means of an expert system.

The identification of the geographical area is in the form of a geographical name, descriptive text, geographical coordinates, or a user name or code associated with a location or a geographical area. Preferably, information for identification of the geographical area is provided automatically by the data sources 3A, 3C, 3D, 3E, 3G, 3H, for example as an identification of a location, a user, a sensor, or a data source. Information for identification of the geographical area can also be provided to the data sources 3A, 3C, 3D, 3E, 3G, 3H by users via a user interface.

The information about the relative impact includes a reference to a technical product, a technical system, and/or an insurance product as well as an impact statement in the form of descriptive text and/or a numerical rating. It is also possible to provide the information about the relative impact in the form of a code assigned to an impact definition stored in the data memory 6. The information about the relative impact is provided automatically either by the data sources 3A, 3C, 3D, 3E, 3G, 3H or by server 10. For example, the information about the relative impact is determined by selecting impact data assigned to the identification of the specific risk and to the rating of the specific risk and stored in the data sources 3A, 3C, 3D, 3E, 3G, 3H or in server 10, respectively. The information about the relative impact can also be provided to the data sources 3A, 3C, 3D, 3E, 3G, 3H by users via a user interface.

User interfaces of the data sources 3A, 3C, 3D, 3E, 3G, 3H are implemented as graphical user interfaces (GUI) or as feedback forms, for example in hypertext mark-up language (HTML). The risk information can alternatively also be provided as encoded voice information. For that purpose, the data sources 3A, 3C, 3D, 3E, 3G, 3H include a microphone and an audio and/or voice recognition processor.

TABLE 2

| stored risk information | | | |
| --- | --- | --- | --- |
| identification of geographical area | identification of risk | rating of risk | relative impact |

As is illustrated schematically in Table 2, the received risk information is stored by assigning the identification of the specific risk, the rating of the specific risk, and, optionally, the information about the relative impact of the specific risk to the geographical area identified by the received risk information. Preferably, the risk information 61 stored in the data memory 6 is composed of defined codes suitable for processing by a computer program.

As is illustrated in FIG. 1, the server 10 comprises detection means 14 for detecting based on the stored risk information 61 a specific risk emerging in a first geographical area A, C, D, E, G, H and spreading to one or more second geographical areas A, B, C, D, E, F, G, H. The detection means 14 are preferably implemented by means of a computer program; however, one skilled in the art will understand that the detection means 14 can also be implemented fully or partly by means of hardware. For instance, the detection means 14 may include a hardware-based neuronal network. The detection means 14 are designed to detect an emerging specific risk based on the ratings of specific risks stored in the data memory 6. In addition, a specific risk emerging in a first geographical area A, C, D, E, G, H and spreading to one or more second geographical areas A, B, C, D, E, F, G, H is detected by the detection means 14 based on area attributes 63 stored in the data memory 6. For example the area attributes 63 include correlation factors 631 and/or data about spreading patterns 632.

Preferably, the detection means 14 are designed to periodically extract risk information 61 stored in the data memory 6, e.g. in the database, and to detect the emerging specific risk based on the periodically extracted risk information. This makes possible risk detection asynchronous to communication and reception of risk information. Depending on the type of the particular risks and particular embodiments of the present invention, the periodic extraction takes place several times a day or just once a week or once a month, for example. Moreover, the detection means 14 are designed to relate a detected emerging risk to its relative impact on a technical product, a technical system and/or an insurance product. The relative impact of an emerging specific risk is based on the information about the relative impact received from the data sources 3A, 3C, 3D, 3E, 3G, 3H or by selecting impact data stored in the server 10, which impact data is assigned to the identification of the specific risk and to the rating of the specific risk. The detection means 14 include preferably an expert system 141 designed to detect the emerging risk and the relative impact based on rules 62 stored in the data memory 6. The stored rules 62 are governing how an emerging risk is detected by the expert system 141 of the detection means 14 based on the extracted risk information and the stored area attributes 63.

As is illustrated schematically in Table 3, the stored area attributes 63 include an identification of a geographical area and one or more area attributes. The area attributes include information about technical, ecological, geological, meteorological, epidemiological, cultural, political and/or economical aspects of a geographical area A, B, C, D, E, F, G, H. Particularly, the area attributes include correlation factors 631 and/or data about spreading patterns 632, as was mentioned above.

TABLE 3

| stored area attributes | |
| --- | --- |
| identification of geographical area | area attributes |

The stored correlation factors 631 indicate commonalities and interdependencies between geographical areas A, B, C, D, E, F, G, H. The correlation factors 631 are specific to a certain type of risk, to a risk factor, various risk factors making up a risk, or to other aspects of the geographical areas A, B, C, D, E, F, G, H mentioned above. In Table 4, correlation factors $f_{ij}$ specific to a particular type of risk, a particular risk factor or a particular other aspect are illustrated for the geographical areas A, B, C, D, E, F, G, H. In Table 4, the rows each illustrate a set of correlation factors $f_{ij}$ stored as area attributes of a geographical area i={A, B, C, D, E, F, G, H}, indicating the level of correlation, for instance in the range of $f_{ij}$=[0 . . . 1], with another geographical area j={A, B, C, D, E, F, G, H}. For example, the correlation factor $f_{BC}$ stored as an area attribute of the geographical area B indicates the rate of correlation with the geographical area C for a particular type of risk, a particular risk factor or a particular other aspect of the geographical areas B, C.

TABLE 4

| i | A | B | C | D | E | F | G | H |
|---|---|---|---|---|---|---|---|---|
| A | — | $f_{AB}$ | $f_{AC}$ | $f_{AD}$ | $f_{AE}$ | $f_{AF}$ | $f_{AG}$ | $f_{AH}$ |
| B | $f_{BA}$ | — | $f_{BC}$ | $f_{BD}$ | $f_{BE}$ | $f_{BF}$ | $f_{BG}$ | $f_{BH}$ |
| C | $f_{CA}$ | $f_{CB}$ | — | $f_{CD}$ | $f_{CE}$ | $f_{CF}$ | $f_{CG}$ | $f_{CH}$ |
| D | $f_{DA}$ | $f_{DB}$ | $f_{DC}$ | — | $f_{DE}$ | $f_{DF}$ | $f_{DG}$ | $f_{DH}$ |
| E | $f_{EA}$ | $f_{EB}$ | $f_{EC}$ | $f_{ED}$ | — | $f_{EF}$ | $f_{EG}$ | $f_{EH}$ |
| F | $f_{FA}$ | $f_{FB}$ | $f_{FC}$ | $f_{FD}$ | $f_{FE}$ | — | $f_{FG}$ | $f_{FH}$ |
| G | $f_{GA}$ | $f_{GB}$ | $f_{GC}$ | $f_{GD}$ | $f_{GE}$ | $f_{GF}$ | — | $f_{GH}$ |
| H | $f_{HA}$ | $f_{HB}$ | $f_{HC}$ | $f_{HD}$ | $f_{HE}$ | $f_{HF}$ | $f_{HG}$ | — |

The stored data about spreading patterns 632 indicate how and at what rate a specific risk emerging in one of the geographical areas A, B, C, D, E, F, G, H is spreading to other geographical areas A, B, C, D, E, F, G, H. Similar to the correlation factors 631, the data about spreading patterns 632 are specific to a certain type of risk, to a risk factor, or to other aspects of the geographical areas A, B, C, D, E, F, G, H mentioned above. As is illustrated schematically in Table 5, the data about spreading patterns 632 are stored as defined sets of spreading attributes $s_{ij}$. In Table 5, the rows each illustrate a set of spreading attributes $s_{ij}$ for one of the geographical areas i={A, B, C, D, E, F, G, H}, indicating the timing of spreading of a specific risk or risk factor emerging in another geographical area j={A, B, C, D, E, F, G, H}. For example, the spreading attributes $s_{BC}$ stored as a spreading attribute of the geographical area B indicate for the geographical area B the timing of spreading of a particular risk or risk factor emerging in the geographical area C.

TABLE 5

| i | A | B | C | D | E | F | G | H |
|---|---|---|---|---|---|---|---|---|
| A | — | $s_{AB}$ | $s_{AC}$ | $s_{AD}$ | $s_{AE}$ | $s_{AS}$ | $s_{AG}$ | $s_{AH}$ |
| B | $s_{BA}$ | — | $s_{BC}$ | $s_{BD}$ | $s_{BE}$ | $s_{BS}$ | $s_{BG}$ | $s_{BH}$ |
| C | $s_{CA}$ | $s_{CB}$ | — | $s_{CD}$ | $s_{CE}$ | $s_{CS}$ | $s_{CG}$ | $s_{CH}$ |
| D | $s_{DA}$ | $s_{DB}$ | $s_{DC}$ | — | $s_{DE}$ | $s_{DS}$ | $s_{DG}$ | $s_{DH}$ |
| E | $s_{EA}$ | $s_{EB}$ | $s_{EC}$ | $s_{ED}$ | — | $s_{ES}$ | $s_{EG}$ | $s_{EH}$ |
| F | $s_{SA}$ | $s_{SB}$ | $s_{SC}$ | $s_{SD}$ | $s_{SE}$ | — | $s_{SG}$ | $s_{SH}$ |
| G | $s_{GA}$ | $s_{GB}$ | $s_{GC}$ | $s_{GD}$ | $s_{GE}$ | $s_{GS}$ | — | $s_{GH}$ |
| H | $s_{HA}$ | $s_{HB}$ | $s_{HC}$ | $s_{HD}$ | $s_{HE}$ | $s_{HS}$ | $s_{HG}$ | — |

For example, the spreading attributes include a time delay value indicating the estimated period of time from the emergence of a specific risk or risk factor in a first one of the geographical areas i={A, B, C, D, E, F, G, H} to the emergence of that specific risk or risk factor in another one of the geographical areas j={A, B, C, D, E, F, G, H}. As is illustrated schematically in Table 5, the spreading attributes include preferably not only a time delay value but a timing sequence. After the emergence of a specific risk or risk factor in a first one of the geographical areas i={A, B, C, D, E, F, G, H}, the timing sequence indicates the expected extent of emergence $e_1, e_2, \ldots, e_n$ in one of the other ones of the geographical areas j={A, B, C, D, E, F, G, H} at specific time intervals $t_1, t_2, \ldots t_n$. For example, the extent of emergence $e_1, e_2, \ldots, e_n$ is indicated as a correlation factor or an expected rating of the specific risk or risk factor. Depending on the type of the particular risks and particular embodiments of the present invention, the length of the time delay or the length of the time intervals, respectively, is one or more hours, one or more days, several weeks, or even one or more months. In essence, data about spreading patterns 632 include time-dependent correlation factors.

TABLE 6

| timing sequence | | | | | |
|---|---|---|---|---|---|
| $t_1$ | $t_2$ | $t_3$ | $t_4$ | ... | $t_n$ |
| $e_1$ | $e_2$ | $e_3$ | $e_4$ | ... | $e_n$ |

The detection means 14 are designed to produce a report based on the stored risk information 61, said report indicating the emerging specific risk and the associated geographical area(s). In an embodiment the detection means 14 are designed to generate automatically a message to an administrator upon detection of an emerging specific risk. The message is transmitted, for example, by way of e-mail, SMS (Short Messaging Services), MMS (Multimedia Messaging), or another type of data messaging.

As is illustrated in FIG. 1, the server 10 comprises signalling means 13 for providing to an interface 5, 5', 5" output data depending on the detected emerging risk and the second geographical areas. For example, depending on the type of the detected emerging risk, the particular geographical area, the rating of that risk, and the relative impact associated with that risk, the signalling means 13 provide state information or instructions, for example, to the interface 5, 5', 5". The state information is indicative of a normal, critical, or alarm state of an external device or system, for example. The instruction is related to preventive or recovery measures in an external device or system, for example. Interface 5, 5', 5" is implemented as a data interface including data memory for storing output data provided by the signalling means 13. Preferably, interface 5, 5', 5" comprises one or more state registers and/or one or more instruction registers. Moreover, interface 5, 5', 5" may also include data memory for storing reports and/or messages mentioned above. As is illustrated schematically in FIG. 1, interface 5 is located in server 10, interface 5' is located in risk detection system 1 and connected to server 10, and interface 5" is connected to communication network 2 and located in device 7" external to the risk detection system 1. Interface 5 is accessible to processes running on server 10 and via communication network 2 to devices 7, 7" external to the risk detection system 1. Interface 5' is accessible via a communication link to device 7' external to the risk detection system 1. Interface 5" is accessible to processes running on device 7". It should be noted that in FIG. 1 various possible embodiments are illustrated. One skilled in the art will understand, that in different embodiments interface 5, interface 5', and/or interface 5" may be present. The signalling means 13 are implemented preferably by means of a computer program; however, one skilled in the field will understand that the signalling means 13 can also be implemented fully or partly by means of hardware. Devices 7, 7', 7" include computers, printers, display terminals, machines, control systems, or other peripheral devices, for example.

Server 10 includes an access control module 15 for controlling and providing users and administrators access via communication network 2 to stored risk information 61, stored rules 62, stored area attributes 63, output data stored in the interface 5, 5', and/or reports or messages generated by the server 10. Preferably, access control module 15 is implemented by means of a computer program.

It should be noted that the proposed computer-based system and method for detecting risks is not only suitable for detecting and analyzing recognized and newly emerging risks in technical systems but also for gathering and analyzing information relating to risks relevant to the development, marketing or administration of an insurance product. Risk perceptions and analysis are relevant not only to technical processes but also to many business processes. The proposed system and method provide a platform for risk detection and impact analysis in the context of technical systems as well as business processes. The manner in which risks are perceived is fundamental in technical systems as well as in business settings. This is particularly so in the insurance industry, where insurable risks must be recognized, or perceived, and subsequently analyzed and quantified. The perceptions of risks vary in different enterprises, cultures, geographical locations, and other settings. As the scope of business operations expand, such variations become increasingly relevant. The emergencies of new risks, which impact existing business operations, or have implications for perspective operations, are also relevant in many industries, including the insurance industry.

The invention claimed is:

1. A computer-based risk detection system comprising:
a server connected to a communication network;
a network interface, at the server, configured to receive risk information from geographical distributed computerized data sources located in first geographical areas via the communication network, the risk information including an identification of a specific risk, a rating of the specific risk, and information for associating the specific risk with one of the first geographical areas;
a memory configured to store received risk information, the identification of the specific risk and the rating of the specific risk being assigned to one of the first geographical areas;
a memory configured to store a plurality of correlation factors associated with geographical areas and a plurality of stored data about spreading patterns, wherein each of said plurality of correlation factors are associated with geographical areas and each of said plurality of stored data about spreading patterns correspond to a different one of a plurality of specific risks including risks associated with technical, ecological, geological, meteorological, epidemiological, cultural, political and economical systems;
a processor configured to detect a specific risk emerging in one of the first geographical areas and spreading to one or more second geographical areas based on stored risk information including the rating of the specific risk assigned to the one of the first geographical areas, the stored correlation factors and the data about spreading patterns; and
an output configured to provide to an interface output data depending on the detected emerging risk and the second geographical areas.

2. The risk detection system according to claim 1, wherein the interface is part of the risk detection system, the interface is configured to store the output data provided by the output, and the interface and the output data stored therein are accessible to devices external to the risk detection system.

3. The risk detection system according to claim 1, further comprising stored area attributes, and wherein the processor is configured to detect the emerging specific risk based on stored area attributes associated with the one of the first geographical areas and with the second geographical areas.

4. The risk detection system according to claim 1, wherein the processor is configured to use an expert system to detect the emerging specific risk based on stored rules.

5. The risk detection system according to claim 1, further comprising a database, wherein the memory storing received risk information is configured to store the received risk information in the database, and the processor is configured to detect the emerging specific risk by periodically extracting risk information stored in the database.

6. The risk detection system according to claim 1, wherein the processor is configured to generate automatically a message to an administrator upon detection of an emerging specific risk.

7. The risk detection system according to claim 1, wherein the risk detection system is configured to relate a detected emerging risk to its relative impact on a technical product, a technical system, and/or an insurance product.

8. The risk detection system according to claim 1, wherein the risk information includes information relating to a relative impact of an identified specific risk on a technical product, a technical system, and/or an insurance product, and the output is configured to include in the output data provided to the interface state information or instructions.

9. A computer-readable recording medium including computer program code, which when executed by one or more processors of a computer-based risk detection server causes the server to perform a method for detecting risks such that:
the server receives risk information from geographical distributed computerized data sources located in first geographical areas via a communication network connected to the server, the risk information including an identification of a specific risk, a rating of the specific risk, and information for associating the specific risk with one of the first geographical areas,
the server stores the received risk information, the identification of the specific risk and the rating of the specific risk being assigned to one of the first geographical areas,
the server stores data about a plurality of spreading patterns and a plurality of correlation factors associated with geographical areas, wherein each of said plurality of correlation factors are associated with geographical areas and each of said plurality of stored data about spreading patterns correspond to a different one of a plurality of specific risks including risks associated with technical, ecological, geological, meteorological, epidemiological, cultural, political, and economical systems,
the server detects a specific risk emerging in one of the first geographical areas and spreading to one or more second geographical areas based on stored risk information including the rating of the specific risk assigned to the one of the first geographical areas, the stored correlation factors and the data about spreading patterns, and
the server provides to an interface output data depending on the detected emerging risk and the second geographical areas.

10. The computer-readable recording medium according to claim 9, further comprising computer program code for controlling the processors of the server such that the server stores the output data in the interface, the interface being located in the server, and such that the server provides to devices external to the server access to the interface and to the output data stored therein.

11. The computer-readable recording medium computer program product according to claim 9, further comprising computer program code for controlling the processors of the server such that the server stores area attributes, and the server detects the emerging specific risk based on stored area attributes associated with the one of the first geographical areas and with the second geographical area.

12. The computer-readable recording medium according to claim 9, further comprising computer program code for controlling the processors of the server such that the server stores rules for an expert system, and such that the server executes the expert system, the expert system being configured to detect the emerging specific risk based on the stored rules.

13. The computer-readable recording medium according to claim 9, further comprising computer program code for controlling the processors of the server such that the server stores received risk information in a database, and such that the server detects the emerging specific risk by periodically extracting risk information stored in the database.

14. The computer-readable recording medium according to claim 9, further comprising computer program code for controlling the processors of the server such that the server generates automatically a message to an administrator upon detection of an emerging specific risk.

15. The computer-readable recording medium according to claim 9, further comprising computer program code for controlling the processors of the server such that the server relates a detected emerging risk to its relative impact on a technical product, a technical system, and/or an insurance product.

16. The computer-readable recording medium according to claim 9, further comprising computer program code for controlling the processors of the server such that the server receives and stores the risk information, the risk information including in addition information relating to a relative impact of an identified specific risk on a technical product, a technical system, and/or an insurance product, and such that the server includes in the output data provided to the interface state information or instructions.

17. A computer-based method for detecting risks, comprising:
    transmitting from geographically distributed computerized data sources located in first geographical areas via a communication network risk information to a server, the risk information including an identification of a specific risk, a rating of the specific risk, and information for associating the specific risk with one of the first geographical areas;
    receiving on the server the risk information transmitted by the geographical distributed computerized data sources;
    storing by the server of received risk information, the identification of the specific risk and the rating of the specific risk being assigned to one of the first geographical areas;
    storing in a memory data about a plurality of spreading patterns and a plurality of correlation factors associated with geographical areas, wherein each of said plurality of correlation factors are associated with geographical areas and each of said plurality of stored data about spreading patterns correspond to a different one of a plurality of specific risks including risks associated with technical, ecological, geological, meteorological, epidemiological, cultural, political, and/or economical systems;
    detecting by the server a specific risk emerging in one of the first geographical areas and spreading to one or more second geographical areas based on stored risk information including the rating of the specific risk assigned to the one of the first geographical areas, the stored correlation factors and the data about spreading patterns; and
    providing by the server to an interface output data depending on the detected emerging risk and the second geographical areas.

18. The computer-based method according to claim 17, wherein the output data is stored by the server in the interface, and the interface and the output data stored therein are made accessible to devices external to the server.

19. The computer-based method according to claim 17, wherein area attributes are stored in a memory, and the detecting the emerging specific risk is based on stored area attributes including correlation factors associated with the one of the first geographical areas and with the second geographical area.

20. The computer-based method according to claim 17, wherein rules for an expert system are stored in a memory, and the emerging specific risk is detected by an expert system based on the stored rules.

21. The computer-based method according to claim 17, wherein the received risk information is stored in a database, and the emerging specific risk is detected by periodically extracting risk information stored in the database.

22. The computer-based method according to claim 17, wherein a message to an administrator is generated automatically upon detection of an emerging specific risk.

23. The computer-based method according to claim 17, wherein a detected emerging risk is related to its relative impact on a technical product, a technical system, and/or an insurance product.

24. The computer-based method according to claim 17, wherein included in the risk information is information relating to a relative impact of an identified specific risk on a technical product, a technical system, and/or an insurance product, and state information or instructions are included in the output data provided to the interface.

* * * * *